United States Patent [19]

Yip

[11] Patent Number: 5,072,662

[45] Date of Patent: Dec. 17, 1991

[54] ELECTRIC TOASTER

[75] Inventor: Kit C. Yip, New Territories, Hong Kong

[73] Assignee: G. E. W. Corporation Limited, Kowloon, Hong Kong

[21] Appl. No.: 600,760

[22] Filed: Oct. 18, 1990

[30] Foreign Application Priority Data

Oct. 20, 1989 [GB] United Kingdom ............... 8923647

[51] Int. Cl.⁵ .............................................. A47J 37/08
[52] U.S. Cl. .................................. 99/327; 99/329 P;
99/329 RT; 99/389; 99/391
[58] Field of Search ............... 99/327, 329 P, 329 RT,
99/335, 329 R, 342, 389, 391, 399-402

[56] References Cited

U.S. PATENT DOCUMENTS

| 2,553,593 | 5/1951 | Lermont | 99/327 |
| 3,140,650 | 7/1964 | Woron | 99/327 |
| 3,636,858 | 1/1972 | Paaskesen | 99/329 RT |
| 4,188,865 | 2/1980 | Bjarsch | 99/329 R |
| 4,345,513 | 8/1982 | Holt | 99/391 |
| 4,345,515 | 8/1982 | Holt | 99/393 |
| 4,402,258 | 9/1983 | Guarnerio | 99/393 |
| 4,976,195 | 12/1990 | Cavazos | 99/390 |
| 4,986,173 | 1/1991 | Hahnewald et al. | 99/400 |

FOREIGN PATENT DOCUMENTS

| 0048769 | 7/1982 | European Pat. Off. . |
| 0084065 | 7/1983 | European Pat. Off. . |
| 333652 | 8/1930 | United Kingdom . |

Primary Examiner—Timothy F. Simone
Attorney, Agent, or Firm—Townsend and Townsend

[57] ABSTRACT

In an electric toaster (1), a carriage (18) which supports the bread slices (8) and (10) to be toasted is movable automatically from a toasting position to a first position (FIG. 1a) where larger slices (10) can be removed and then manually to a second position (FIG. 1b) where smaller slices (8) can be removed.

5 Claims, 4 Drawing Sheets

ELECTRIC TOASTER

The present invention relates to an electric toaster.

BACKGROUND AND SUMMARY OF THE INVENTION

In conventional domestic electric toasters the bread or other item to be toasted is supported on a carriage. The carriage moves between a lower position where the bread is supported between the electrical elements of the toaster to toast it, and an upper position where the bread projects out through a slot in the top of the toaster. The carriage is moved to the lower, toasting position against the action of a spring where it causes the electrical elements to be turned on and is held against upward movement by a controlled latching mechanism. When the toasting operation is finished the carriage is released by the latching mechanism and moves to the upper position under the action of a spring.

A drawback of such electric toasters is that they are generally designed for bread of a particular height and the carriage is arranged so that the slice of toasted bread extends a short way out of the slot when the carriage is in its upper position. When toasting smaller items such as English muffins, rolls or small pieces of bread, the smaller item does not extend out through the slot in the top of the toaster. To retrieve the muffin etc. from the toaster it is necessary to turn the toaster upside down, or use a knife etc. to extract it or poke one's fingers into the slot. All these operations are fraught with danger for the user.

According to the invention there is provided an electric toaster having a generally closed housing with an elongate top opening for insertion of an item to be toasted; a vertically movable elongate carriage in the housing for supporting the item in three discrete operative positions corresponding to a lowermost toasting position, a first toast-removal position and a second toast-removal position higher than said first position, a vertical slot in the housing; a carriage support bracket fixed at one end of the carriage slidably mounted on vertical rails, having an operating arm extending through the vertical slot and first inter-engaging means fixed on the bracket; a second bracket slidably mounted on the rails and vertically movable relative to the carriage support bracket, having a latching arm for cooperating with a hold-down latch and second fixed interengaging means fixed to the second bracket; a spring to bias the second bracket upwards towards an uppermost position of the second bracket corresponding to the first toast-removal position, in which the first and second interengaging means abut one another to move the support bracket and second bracket simultaneously when the operating arm is moved downwards towards the toasting position to cause the latching arm to engage the hold-down latch, and abut one another when the second bracket is released by the hold-down latch and is moved upwards by the spring to its uppermost position, and in which the support bracket is free to move upwards relative to the second bracket when the arm is moved to raise the support bracket from the first toast-removal position to the second toast removal position.

The electric toaster may include an electric switch operating arm fixed to the second bracket to close the switch whenever the hold-down latch holds down the latching arm.

The first interengaging means may comprise a projection on the support bracket and the second interengaging means comprise a ledge on the second bracket.

The support bracket may be integrally formed with the operating arm by pressing and folding from sheet metal having apertures which fit over the rails.

The second bracket may be integrally formed with the latching arm by pressing and folding from sheet metal with apertures which fit over the rails.

The invention will be further described by way of example with reference to the accompanying drawings.

DESCRIPTION OF THE INVENTION AND PREFERRED EMBODIMENTS

Figure 1A:
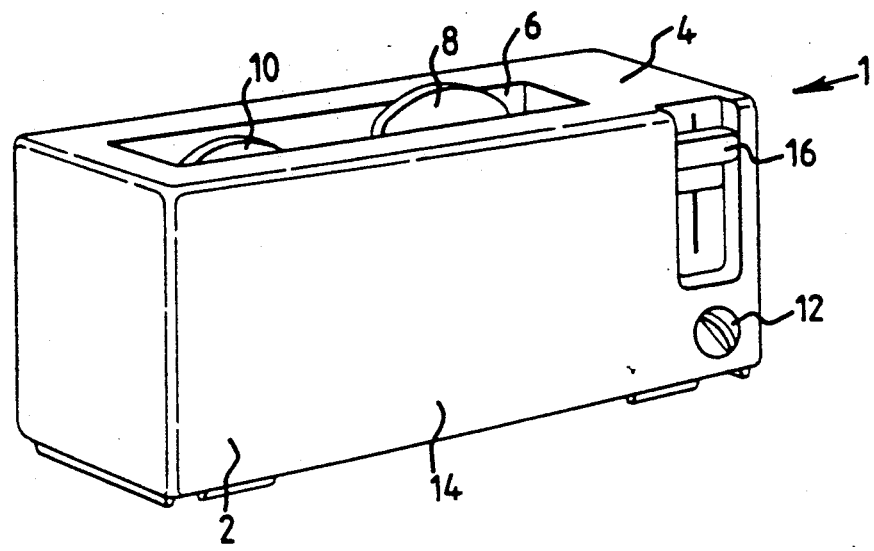
FIGS. 1a and 1b illustrate a manner of operation of an electric toaster forming an embodiment of the present invention.
Figure 1B:
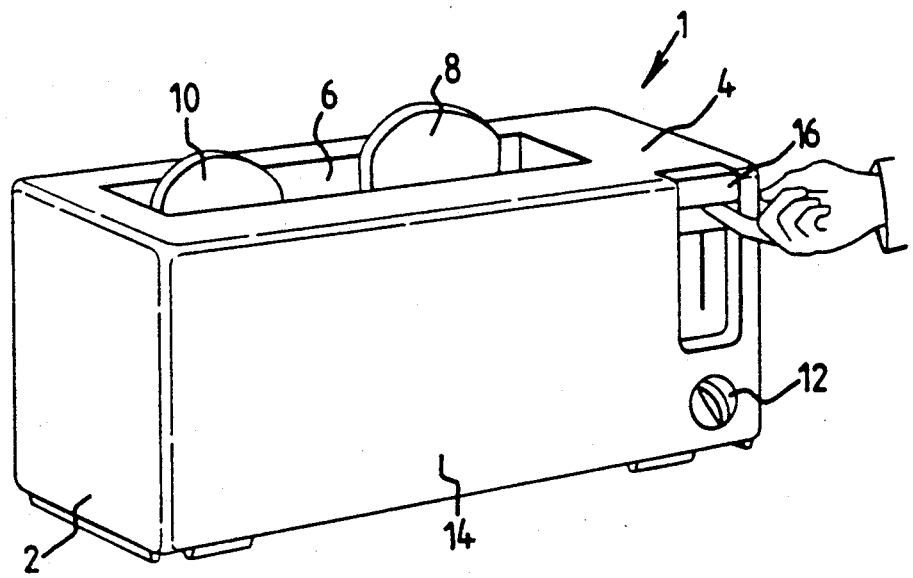

FIGS. 1a and 1b are perspective views of an electric toaster forming an embodiment of the invention. The toaster 1 comprises a closed or generally-closed housing 2 having in its upper wall 4 slot 6 for insertion of slices of bread 8, 10 or other items to be toasted. A control knob 12 on a front wall 14 of the housing 2 controls the degree of toasting of the bread slices 8 and 10 in conventional manner. The slices 8 and 10 are supported on a carriage (not shown in FIGS. 1a and 1b) connected to a slider control knob 16.

Figure 2A:
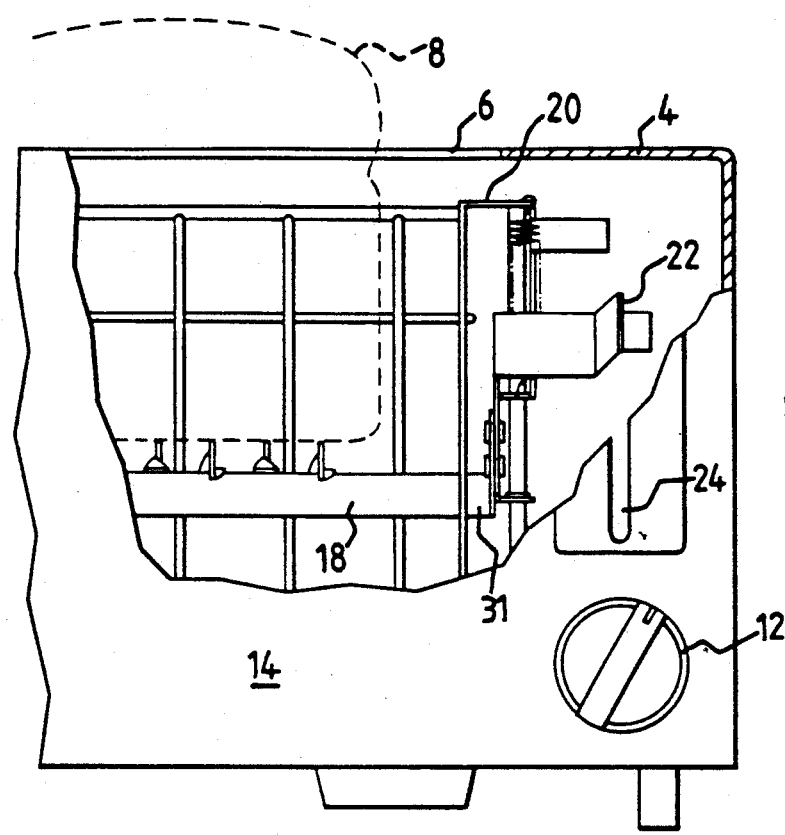
FIGS. 2a and 2b are cutaway side views of the toaster of FIGS. 1a and 1b.
Figure 2B:
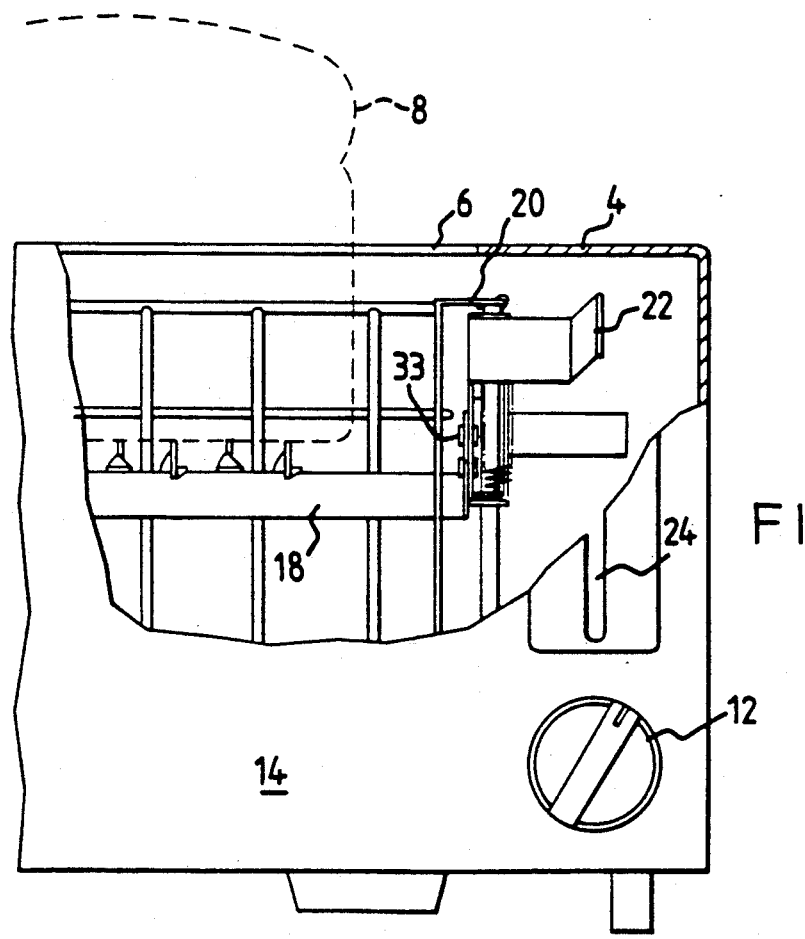

FIG. 1a shows the toaster 1 with an elongate carriage 18 and slider knob 16 in a first upper position. To toast items of bread slices 8 and 10, the bread is inserted through the slot 6 to rest on the carriage and the knob 16 is depressed to move the carriage to a lower, toasting position where it is held in position by a hold-down latch (not shown) and the bread is toasted. When toasting is complete the latch automatically releases the carriage, in a manner well-known in electric toasters, and the carriage returns under the action of a spring to the position of FIG. 1a. In this position, a first toast-removal position, the larger slice of bread 8 can be easily retrieved, but the smaller slice 10 does not project above the wall 4. To retrieve the smaller slice 10, the knob 16 is manually lifted, FIG. b, to raise the carriage to a second, upper position closer to the upper wall 4, a second toast-removal position, whereupon the slice 10 can be easily retrieved. FIGS. 2a and 2b correspond to the positions seen in FIGS. 1a and 1b and show a part view of the toaster 1 with the front wall 14 partially cut away. The carriage 18 supporting the slices 8 and 10 is shown and this slides vertically in slots in end plates, one of which 20, is seen in FIGS. 2a and 2b. The knob 16 is carried on an operating arm 22 which slides in a vertical slot 24 in the front wall 14.

The mechanism enabling the carriage 18 to be moved to two different upper (toast-removal) positions will be more fully described with reference to FIGS. 3 and 4. FIG. 3 is a view of the right hand end, as seen in FIGS. 1a and 1b, of the toaster 1 with an end wall removed. The end plate 20 carries two vertical guide rails 26 between flanges 28a and 28b. A carriage support bracket 30 is pressed and folded from sheet metal and is fixed to an end 31 of the carriage 18 which projects through the vertical slot 32. The end 31 carries two pins 33 which slide a short distance in elongate apertures 35 in the slide member 30. The bracket 30 has apertures 34 in flanges 36a and 36b which guide it on the rails 26.

A second bracket 38 is pressed and folded from sheet metal and has apertures 40 in flanges 42a and 42b to guide the bracket 38 on rails 26. The lower flange 42b is positioned above the lower flange 34b of the bracket 30. A closed coil spring 46 is mounted between the flange 42b and upper flange 28a to bias the bracket 38 to an uppermost position where the flange 42a presses against the flange 28a. An ear 48, forming a first interengaging means, on the bracket 30 is caught by the lower flange 42b, forming a second interengaging means, as the bracket 38 rides up the rails 26 and so the bracket 30 is pulled up simultaneously with the bracket 38, the first and second engaging members abutting one another. The bracket 30 is however, thereafter, free to be moved upwardly relative to the bracket 38 until the flange 36b abuts flange 42b.

The movement of the brackets (to provide three operative positions) will now be described with reference to FIGS. 3a, b, c and d.

Figure 3A:
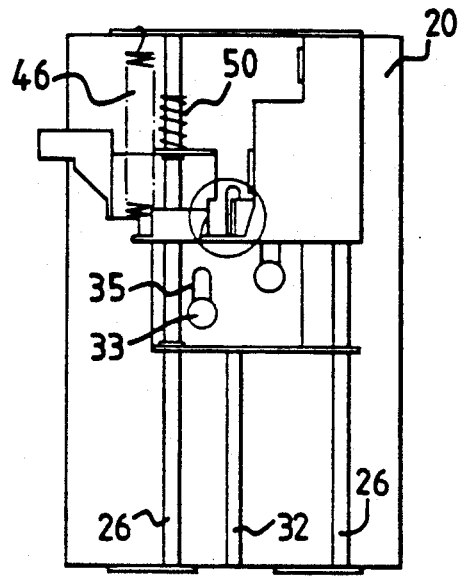
FIGS. 3a, 3b, 3c and 3d show an end view of a mechanism for moving a carriage of the toaster of FIGS. 1a and b.
Figure 4:
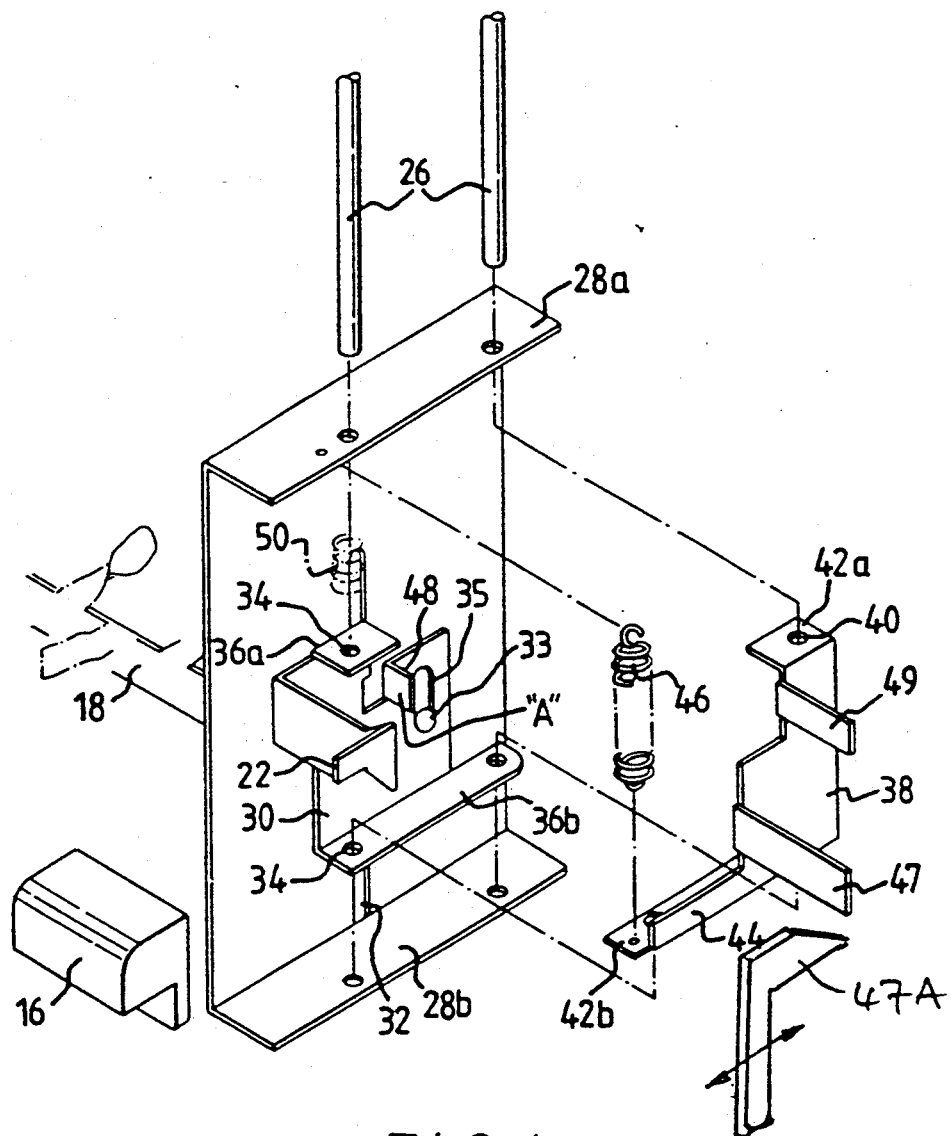
FIG. 4 is an exploded view of the mechanism of FIGS. 3a, 3b, 3c and 3d.

FIG. 3a shows the toaster 1 with the carriage 18 in the first or lower toast-removal position. The spring 46 holds the second bracket 38 in a raised uppermost position, which in turn holds up the bracket 30, the ear 48 being carried on flange 42b. The pins 33 are in the bottom of the slots 35.

Figure 3B:
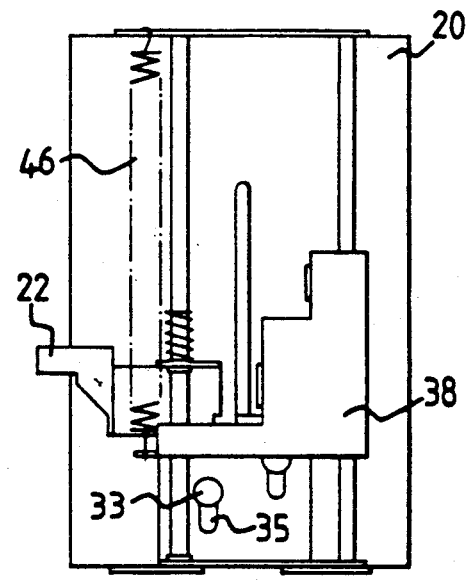

A slice of bread or the like is placed on the carriage 18 and the knob 16, mounted on arm 22, is pressed down. The ear 48 bears on the flange 42b and so both brackets 30 and 38 are lowered, until the carriage 18 reaches the toasting position at the bottom of the toaster. The bracket 38 is latched in position, against the force of spring 46, by a conventional releasable hold-down latch 47a which cooperates with a latching arm 47. An electric switch operating arm 49 actuates a switch (not shown) to turn on toaster heating elements. The carriage 18 is arranged to stop its downwards travel shortly before the bracket 30 and hence pins 33 ride up in the slots 35. The carriage 18 and bracket 30 therefore rest at the bottom of the toaster, in the toasting position (FIG. 3b). Upward movement of the bracket 30, which can be caused by manual movement of the slider 16, is limited by flange 36b engaging the flange 42b.

Figure 3C:
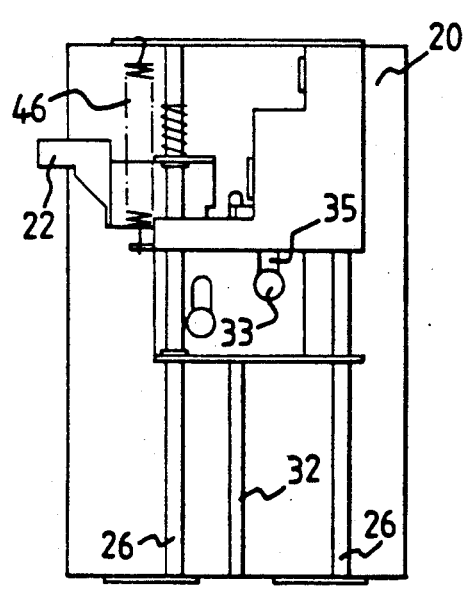
Figure 3D:
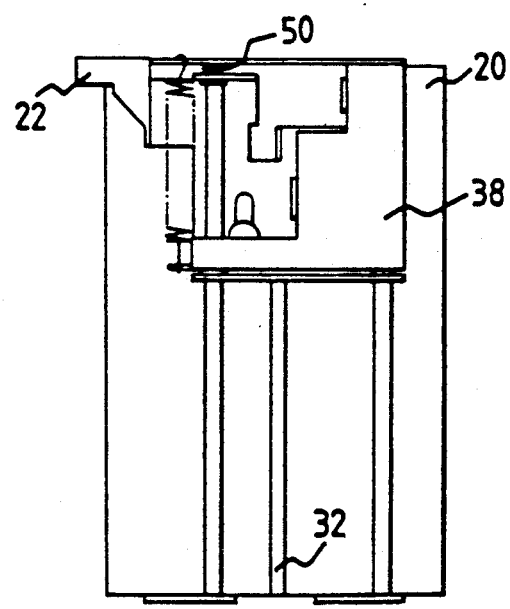

When toasting is completed the heating elements are turned off and the hold-down latch 47A moves to its left in the conventional manner to disengage the arm 47 to release the bracket 38 which is then drawn rapidly upwards by the spring 46, carrying with it the bracket 30 and the carriage 18 towards the first toast-removal position, as seen in FIG. 3c, this is the same position in the FIG. 3a position. This is because the lower flange 42b moves away from the lower flange 36b on the first slide member 30 and engages underneath the ear 48. The bracket 38 moves up until the upper flange 42a abuts the upper flange 28a.

If a small piece of toast is present on the carriage 18, the carriage 18 can be raised to a second upper toast-removal position by manually lifting the knob 16 and hence the bracket 30. The bracket 38 remains in the position (shown in FIGS. 3a and 3d). An open coiled spring 50 is positioned on a guide rail 26 above the flange 36a to cushion the upward manual movement of the bracket 30.

Various modifications may be made to the described embodiment and it is desired to include all such modifications together with mechanical and functional equivalents as properly fall within the scope of the invention. Such variations include a releasable latch arranged to allow the latching arm 47 to be released if sufficient but reasonable upward pressure is applied to the knob 16. This allows the toasting period to be manually interrupted prematurely or before the normal releasing operation of the hold-down latch.

What is claimed is:

1. An electric toaster having a generally closed housing with an elongate top opening for insertion of an item to be toasted; a vertically movable elongate carriage in the housing for supporting the item in three discrete operative positions corresponding to a lowermost toasting position, a first toast-removal position and a second toast-removal position higher than said first position, a vertical slot in the housing; a carriage support bracket fixed at one end of the carriage slidably mounted on vertical rails, having an operating arm extending through the vertical slot and first inter-engaging means fixed on the bracket; a second bracket slidably mounted on the rails and vertically movable relative to the carriage support bracket, having a latching arm for cooperating with a hold-down latch and second interengaging means fixed to the second bracket; a spring to bias the second bracket upwards towards an uppermost position of the second bracket corresponding to the first toast-removal position, in which the first and second interengaging means abut one another to move the support bracket and second bracket simultaneously when the operating arm is moved downwards towards the toasting position to cause the latching arm to engage the hold-down latch, and abut one another when the second bracket is released by the hold-down latch and is moved upwards by the spring to its uppermost position, and in which the support bracket is free to move upwards relative to the second bracket when the arm is moved to raise the support bracket from the first toast-removal position to the second toast-removal position.

2. An electric toaster according to claim 1, including an electric switch operating arm fixed to the second bracket to close the switch whenever the hold-down latch holds down the latching arm.

3. An electric toaster according to claim 1, in which the first interengaging means comprising a projection on the support bracket and the second interengaging means comprises a ledge on the second bracket.

4. An electric toaster according to claim 1, the support bracket being integrally formed with the operating arm by pressing and folding from sheet metal having apertures which fit over the rails.

5. An electric toaster according to claim 1 in which the second bracket being integrally formed with the latching arm by pressing and folding from sheet metal with apertures which fit over the rails.

* * * * *